US011551456B2

(12) United States Patent
Lei et al.

(10) Patent No.: US 11,551,456 B2
(45) Date of Patent: Jan. 10, 2023

(54) ENHANCED INFRASTRUCTURE

(71) Applicant: Ford Global Technologies, LLC, Dearborn, MI (US)

(72) Inventors: Oliver Lei, Windsor (CA); Jayanthi Rao, West Bloomfield, MI (US); Somak Datta Gupta, Novi, MI (US); Vladyslav Slyusar, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 208 days.

(21) Appl. No.: 16/903,446

(22) Filed: Jun. 17, 2020

(65) Prior Publication Data

US 2021/0397853 A1 Dec. 23, 2021

(51) Int. Cl.
*G06V 20/56* (2022.01)
*G07C 5/00* (2006.01)
*B60W 60/00* (2020.01)
*G06V 10/75* (2022.01)
*G06F 16/29* (2019.01)

(52) U.S. Cl.
CPC ............ *G06V 20/56* (2022.01); *B60W 60/00* (2020.02); *G06V 10/751* (2022.01); *G07C 5/008* (2013.01); *B60W 2420/403* (2013.01); *G06F 16/29* (2019.01)

(58) Field of Classification Search
CPC ..... G06V 20/56; G06V 10/751; B60W 60/00; B60W 2420/403; G07C 5/008; G06F 16/29
USPC ........................................................ 382/104
See application file for complete search history.

(56) References Cited

U.S. PATENT DOCUMENTS

| 6,597,818 | B2 * | 7/2003 | Kumar | ................. G06T 3/0081 |
| | | | | 707/999.102 |
| 8,352,112 | B2 | 1/2013 | Mudalige | |
| 8,447,519 | B2 | 5/2013 | Basnayake et al. | |
| 9,711,050 | B2 | 7/2017 | Ansari | |
| 10,026,314 | B1 * | 7/2018 | Philosof | ............... G08G 1/0141 |
| 10,082,797 | B2 | 9/2018 | Micks et al. | |
| 10,101,745 | B1 | 10/2018 | Sun et al. | |

(Continued)

FOREIGN PATENT DOCUMENTS

| WO | 2018182732 A1 | 10/2018 |
| WO | 2019078866 A1 | 4/2019 |
| WO | 2019104280 A1 | 5/2019 |

*Primary Examiner* — Gertrude Arthur Jeanglaude
(74) *Attorney, Agent, or Firm* — Frank A. MacKenzie; Bejin Bieneman PLC

(57) ABSTRACT

A system includes a stationary infrastructure element including a camera mounted to the infrastructure element and an infrastructure server. The infrastructure server includes a processor and a memory, the memory storing instructions executable by the processor to receive a request from a movable vehicle, the request identifying a data anomaly including at least one of (1) a sensor of the vehicle collecting data below a confidence threshold or (2) a geographic location outside a geographic database of the vehicle, to actuate the camera to collect image data of one of the vehicle or the geographic location, to identify geo-coordinates of the vehicle or the geographic location based on identified pixels in the image data including the vehicle or the geographic location, and to provide the geo-coordinates to the vehicle to address the data anomaly.

20 Claims, 7 Drawing Sheets

(56) References Cited

U.S. PATENT DOCUMENTS

| | | |
|---|---|---|
| 10,127,814 B2 | 11/2018 | Mitra et al. |
| 10,133,273 B2 | 11/2018 | Linke |
| 10,176,596 B1 * | 1/2019 | Mou .................. G01S 17/89 |
| 10,331,141 B2 | 6/2019 | Grimm et al. |
| 10,349,011 B2 | 7/2019 | Du et al. |
| 10,395,515 B2 | 8/2019 | Wouhaybi et al. |
| 10,403,135 B2 | 9/2019 | Rosales et al. |
| 11,312,392 B2 * | 4/2022 | Katardjiev ....... G08G 1/096725 |
| 2010/0114478 A1 * | 5/2010 | Bai .................. G09B 29/102 |
| | | 707/E17.005 |
| 2018/0039269 A1 | 2/2018 | Lambermont et al. |
| 2018/0052860 A1 | 2/2018 | Hayes et al. |
| 2018/0159935 A1 | 6/2018 | Cavalcanti et al. |
| 2018/0283880 A1 | 10/2018 | Croyle et al. |
| 2018/0339730 A1 | 11/2018 | Hovis et al. |
| 2018/0341273 A1 | 11/2018 | Micks et al. |
| 2018/0376305 A1 | 12/2018 | Ramalho de Oliveira |
| 2019/0045378 A1 | 2/2019 | Rosales et al. |
| 2019/0055015 A1 * | 2/2019 | Allard ................ B60R 16/0234 |
| 2019/0088148 A1 | 3/2019 | Jacobus et al. |
| 2019/0101410 A1 | 4/2019 | Kuper et al. |
| 2019/0104525 A1 | 4/2019 | Santhanam et al. |
| 2019/0138007 A1 | 5/2019 | Baghsorkhi et al. |
| 2019/0222652 A1 | 7/2019 | Graefe et al. |
| 2019/0024336 A1 | 8/2019 | Huang et al. |
| 2019/0244521 A1 | 8/2019 | Ran et al. |
| 2019/0294167 A1 | 9/2019 | Kutila et al. |
| 2019/0297600 A1 | 9/2019 | Kim et al. |
| 2020/0160550 A1 * | 5/2020 | Hunt .................. G06V 10/44 |
| 2021/0105619 A1 * | 4/2021 | Kashani ................ G10L 15/25 |

\* cited by examiner

ENHANCED INFRASTRUCTURE

BACKGROUND

Vehicles can be equipped with computers, networks, sensors and controllers to acquire data regarding the vehicle's environment and/or to operate vehicle components. Vehicle sensors can provide data about a vehicle's environment, e.g., concerning routes to be traveled and objects to be avoided in the vehicle's environment. Further, vehicles can receive data from one or more external sources, e.g., a central server, a sensor mounted to infrastructure, etc.

DETAILED DESCRIPTION

Figure 1:
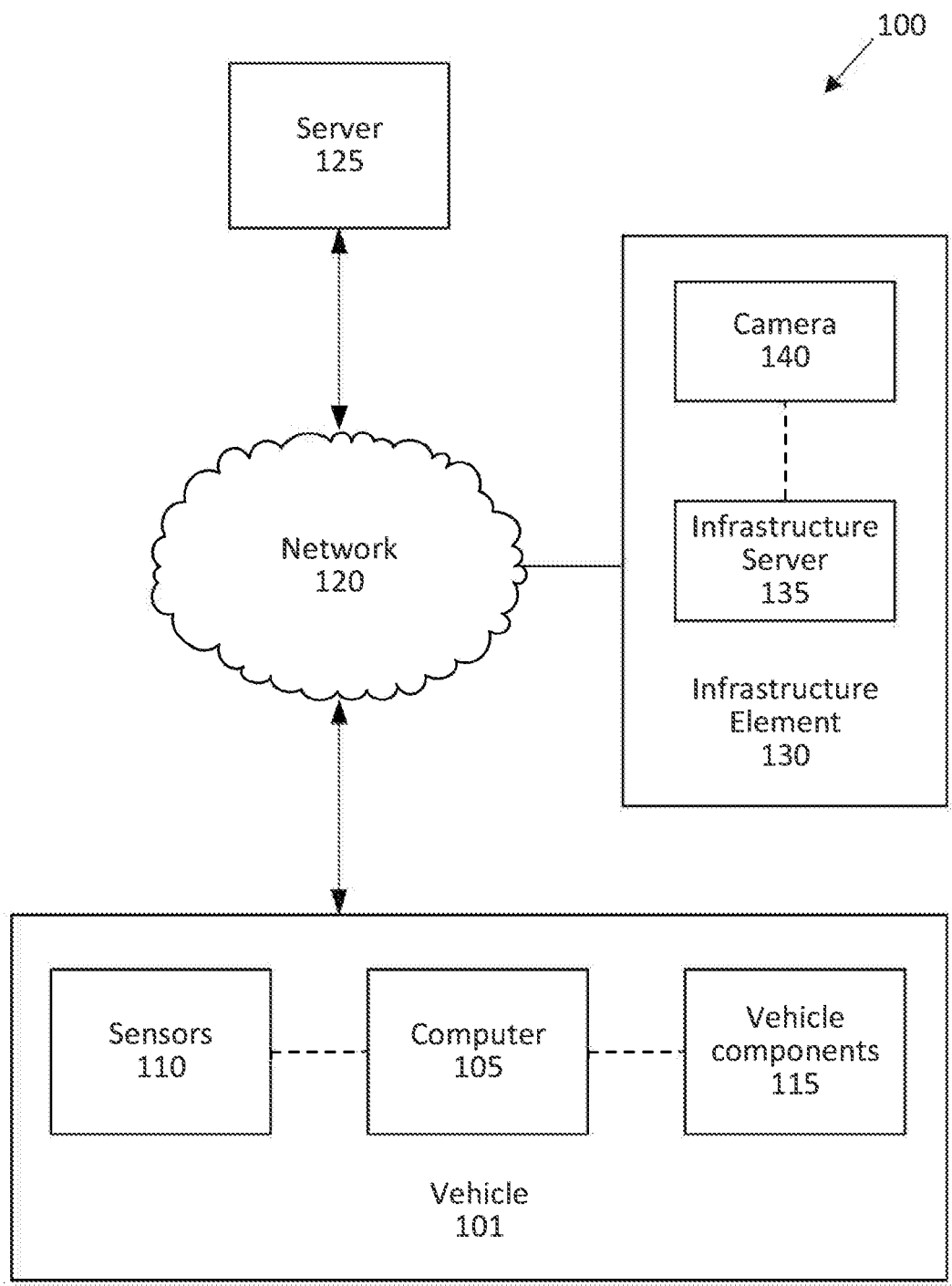
FIG. 1 is a block diagram of an example system for detecting a vehicle.

A system includes a stationary infrastructure element including a camera mounted to the infrastructure element. and an infrastructure server including a processor and a memory. The memory stores instructions executable by the processor to receive a request from a movable vehicle, the request identifying a data anomaly including at least one of (1) a sensor of the vehicle collecting data below a confidence threshold or (2) a geographic location outside a geographic database of the vehicle, actuate the camera to collect image data of one of the vehicle or the geographic location, identify geo-coordinates of the vehicle or the geographic location based on identified pixels in the image data including the vehicle or the geographic location, and provide the geo-coordinates to the vehicle to address the data anomaly.

The instructions can further include instructions to request data from one or more vehicles other than the vehicle according to the request from the vehicle.

The instructions can further include instructions to provide the requested data to the vehicle until the vehicle exits a broadcast range of the infrastructure server.

The instructions can further include instructions to assign a distance resolution to each pixel and to identify the geo-coordinates of the vehicle or the geographic location based the respective distance resolutions for the pixels assigned to the vehicle or the geographic location.

The instructions can further include instructions to identify a relative distance between the infrastructure element and the vehicle or the geographic location based on the respective distance resolutions for the pixels including the vehicle or the geographic location.

The instructions can further include instructions to assign geo-coordinates to each pixel and to provide, to the vehicle, the respective geo-coordinates assigned to the pixels including the vehicle or the geographic location.

The instructions can further include instructions to identify a boundary including the vehicle or the geographic location and to provide geo-coordinates of pixels enclosed by the boundary to the vehicle.

The vehicle can include a computer programmed to determine that the sensor is collecting data below the confidence threshold when the sensor fails to collect data.

The system can further include a vehicle computer programmed to compare a planned path of the vehicle to a high-resolution map stored in the memory of the computer and to identify the data anomaly when at least one geographic location of the planned path is not provided in the high-resolution map.

The system can further include a vehicle computer programmed to, upon identifying the data anomaly, identify a geographic area in which the sensor did not collect data and to send the request including the identified geographic area.

The system can further include a vehicle computer programmed to determine an occlusion of the sensor and to determine that the sensor is collecting data below the confidence threshold when the occlusion exceeds an occlusion threshold.

The system can further include a vehicle computer programmed to identify the data anomaly when image data collected by the sensor of the vehicle includes a light saturation from sunlight exceeding a saturation threshold.

A method includes receiving a request from a movable vehicle, the request identifying a data anomaly including at least one of (1) a sensor of a vehicle collecting data below a confidence threshold or (2) a geographic location outside a geographic database of the vehicle, actuating a camera to collect image data of one of the vehicle or the geographic location, identifying geo-coordinates of the vehicle or the geographic location based on identified pixels in the image data including the vehicle or the geographic location, and providing the geo-coordinates to the vehicle to address the data anomaly.

The method can further include requesting data from one or more vehicles other than the vehicle according to the request from the vehicle.

The method can further include providing the requested data to the vehicle until the vehicle exits a broadcast range of the infrastructure server.

The method can further include assigning a distance resolution to each pixel and identifying the geo-coordinates of the vehicle or the geographic location based the respective distance resolutions for the pixels assigned to the vehicle or the geographic location.

The method can further include identifying a relative distance between the infrastructure element and the vehicle or the geographic location based on the respective distance resolutions for the pixels including the vehicle or the geographic location.

The method can further include assigning geo-coordinates to each pixel and providing, to the vehicle, the respective geo-coordinates assigned to the pixels including the vehicle or the geographic location.

The method can further include identifying a boundary including the vehicle or the geographic location and providing geo-coordinates of pixels enclosed by the boundary to the vehicle.

The method can further include determining that the sensor is collecting data below the confidence threshold when the sensor fails to collect data.

The method can further include comparing a planned path of the vehicle to a high-resolution map stored in the memory of the computer and identifying the data anomaly when at least one geographic location of the planned path is not provided in the high-resolution map.

The method can further include, upon identifying the data anomaly, identifying a geographic area in which the sensor did not collect data and sending the request including the identified geographic area.

The method can further include determining an occlusion of the sensor and determining that the sensor is collecting data below the confidence threshold when the occlusion exceeds an occlusion threshold.

The method can further include identifying the data anomaly when image data collected by the sensor of the vehicle includes a light saturation from sunlight exceeding a saturation threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in a vehicle can identify a data anomaly resulting from inaccurate or incomplete data from a faulty sensor and/or upon identifying a location not stored in a memory of the computer. To operate the vehicle and address the data anomaly, the computer can communicate with an infrastructure server mounted to an infrastructure element. The computer can request data about the vehicle and/or the geographic location to address the data anomaly. The infrastructure server can actuate a camera mounted to the infrastructure element to collect a plurality of images. The infrastructure server can identify the vehicle and/or the geographic location from the request in the images. To address the data anomaly, the infrastructure server can provide geo-coordinates of the vehicle and/or the geographic location to the computer. The infrastructure server can collect high-resolution geo-coordinate data to provide precise geo-coordinates to the computer. The computer improves operation of the vehicle by requesting precise geo-coordinate data to address the data anomaly. That is, the vehicle can operate with more location data at higher precision than would have been collected with the faulty sensor and/or the incomplete location map. Because the infrastructure server provides data in its local area, requests to a central server may be reduced, reducing computations performed by the central server. Localizing data requests to multiple infrastructure servers distributed along roadways may reduce overall computations performed by a network of computers and transmissions sent over a communications network.

FIG. 1 illustrates an example system 100 for detecting a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc. The vehicle 101 is movable, i.e., can move from a first location to a second location.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the host vehicle 101 network or bus, e.g., data relating to vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, lidar, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data. The collected data can be stored in the data store 106.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), Cellular-V2X, etc.), local area networks (LAN) and/or wide area networks (WAN), including the Internet, providing data communication services.

The system 100 includes an infrastructure element 130. In this context, an "infrastructure element" is a stationary structure near a roadway such as a pole, a bridge, a wall, etc. That is, the infrastructure element 130 is fixed to a single location. The infrastructure element 130 includes an infrastructure server 135 including a processor and a memory. The infrastructure element 130 can include a camera 140, i.e., the camera 140 is stationary. The camera 140 is mounted to the infrastructure element 130. The camera 140 collects data about one or more objects on a roadway and stores the data in the memory of the infrastructure server 135. The infrastructure server 135 can identify objects in the data collected by the camera 140, e.g., vehicles 101, pedestrians, cyclists, etc. The infrastructure server 135 can communicate with the computer 105 and the server 125 over the network 120. For example, the infrastructure server 135 can broadcast data to one or more computers 105 in respective vehicles 101 indicating objects identified by the camera 140.

Figure 2:
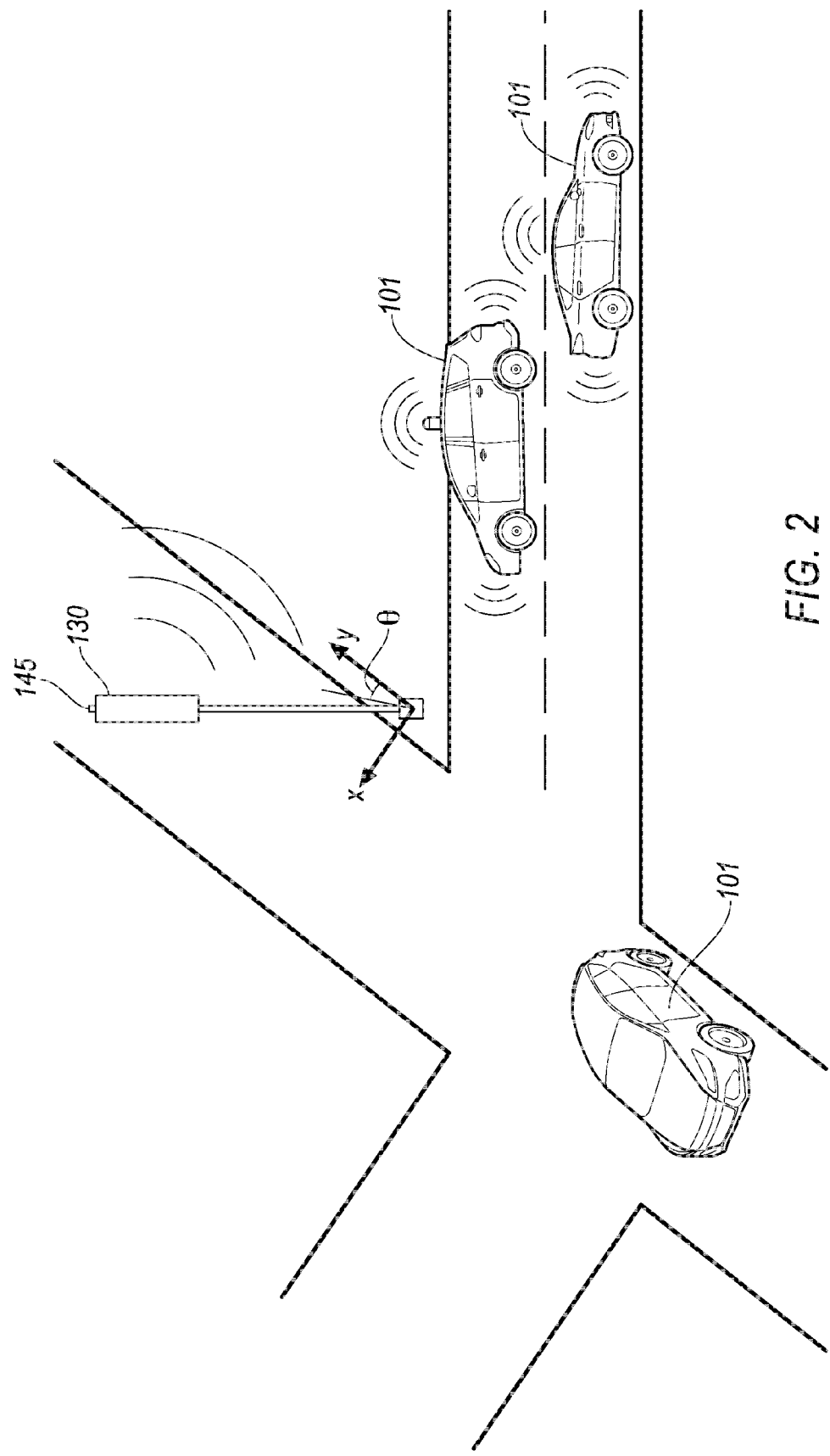
FIG. 2 is a perspective view of an infrastructure element and a plurality of vehicles.

FIG. 2 is a view of a roadway with a plurality of vehicles 101 and an infrastructure element 130. The infrastructure element 130 collects data about the plurality of vehicles 101 on the roadway. That is, the camera 140 collects data, and the infrastructure server 135 analyzes the data to identify a location of one or more vehicles 101 on the roadway. In this context, a "location" is a set of geo-coordinate data, e.g., a latitude coordinate and a longitude coordinate in a global geo-coordinate system. The geo-coordinate data include a position and a heading angle, as described below. FIG. 2 shows the infrastructure element 130 defining a global coordinate system with an x axis along lines of latitude and a y axis along lines of longitude. A "position" is a location in a coordinate system, e.g., the global geo-coordinate system, a local coordinate system, etc. The position in FIG. 2 is the x, y set of coordinates in the global coordinate system. A "heading angle" is an angle defined between a current trajectory of a vehicle 101 and an axis of the coordinate system, e.g., the angle θ defined from the x axis counterclockwise. The infrastructure server 135 can transmit the data collected by the camera 140 to one or more computers 105 in vehicles 101 within a broadcast radius of the infrastructure element 130.

The camera 140 is mounted to the infrastructure element 130. The camera 140 can collect image data about one or more vehicles 101 on the roadway. Alternatively or additionally, the camera 140 can collect image data of a specified geographic location on the roadway. The infrastructure server 135 can, based on the image data, identify a location of the vehicle 101 and/or the specified geographic location. The infrastructure server 135 can transmit the identified location to a computer 105 in one of the vehicles 101 on the roadway.

The computer 105 can identify a data anomaly. In this context, a "data anomaly" is an identification that the computer 105 lacks data used for operation of the vehicle 101. For example, the data anomaly can be an identification that a sensor 110 of the vehicle is collecting data below a confidence threshold. The confidence threshold can be a predetermined percentage of faulty or noisy data collected by the sensor identified during simulation testing of virtual vehicles 101 on virtual roadways. For example, the computer 105 can instruct the sensor 110 to collect data and the computer 105 can identify the data anomaly when the sensor 110 fails to collect data. In another example, the confidence threshold can be a resolution of collected geo-coordinate data determined by simulation and/or experimental testing of vehicles on roadways, e.g., a 10 centimeter resolution. That is, when the sensor 110 collects data with a 30 centimeter resolution, the computer 105 can determine that the collected data do not have the precision specified by the confidence threshold and can identify the data anomaly.

In another example, the computer 105 can identify an occluding structure (e.g., a road sign, the infrastructure element 130, etc.) on the roadway, and the computer 105 can identify the data anomaly. That is, the computer 105 can determine that the sensor 110 is collecting data below the confidence threshold when the occlusion exceeds an occlusion threshold. The occlusion threshold can be a percentage of data (e.g. a number of pixels) that are faulty and/or uncollected, e.g., a number of pixels of an image sensor 110 blocked by occluding matter such as debris. For example, the occlusion threshold can be 50% of the pixels that are uncollected. The occlusion threshold can be determined based on simulation and/or experimental testing of sensors in vehicles to determine the amount of data required for image-processing algorithms in the vehicles to correctly identify objects when an occluding structure is present.

In yet another example, the computer 105 can determine that the sensor 110 is collecting data below the confidence threshold when image data collected by the sensor 110 includes a light saturation from a light source (e.g., sun light) exceeding a saturation threshold. The saturation threshold can be a percentage of data that are faulty or uncollected, e.g., a number of pixels that are identified as white because of insolation and/or glare from the sun. That is, sunlight can saturate an image sensor, i.e., can render pixels as white and obscure light from objects that would be collected without the saturated insolation. For example, the saturation threshold can be 50% of the pixels that are white. The saturation threshold can be determined based on simulation and/or experimental testing of sensors in vehicle and to determine the amount of data required for image-processing algorithms in the vehicles to correctly identify objects when pixels are saturated with sunlight.

In another example, the data anomaly can be an identification of a geographic location, i.e., a geographic area or point, outside a geographic database stored in a memory of the computer 105 of the vehicle 101. For example, the computer 105 can identify the data anomaly upon detecting a portion of a roadway that is not included or recognized in a high-resolution map in the memory of the computer 105. That is, the computer 105 can compare a planned path of the vehicle 101 to a high-resolution map stored in the memory. Upon identifying at least one geographic location on the planned path that is not provided and recognized in the high-resolution map, the computer 105 can identify the data anomaly.

The infrastructure server 135 receives a request from a vehicle 101. In this context, a "request" is a message sent from the computer 105 to the infrastructure server 135 indicating a data anomaly and data requested to address the data anomaly. The request includes the data anomaly that includes at least one of a sensor 110 of the vehicle 101 collecting data below a confidence threshold or a geographic location outside a geographic database of the vehicle 101. The infrastructure server 135 can actuate the camera 140 to collect data for one of the vehicle 101 or the geographic location. The infrastructure server 135 identifies geo-coordinates of the vehicle 101 or the geographic location based on identified pixels in the image data including the vehicle 101 or the geographic location, as described below. The infrastructure server 135 provides data such as road sign data, road topology data, and the geo-coordinates to the computer 105 to address the data anomaly. The infrastructure server 135 can provide the requested data, updated if needed (e.g. geo-coordinates), to the requesting vehicle 101 until the vehicle 101 exits a broadcast range of the infrastructure server 135. A "broadcast range" is a distance around the infrastructure element 130 in which the infrastructure server 135 can broadcast data, e.g., the geo-coordinates. Upon identifying the data anomaly, the computer 105 can identify a geographic area in which the sensor 110 did not collect data and to send the request including the identified geographic area to the infrastructure server 135.

The infrastructure server 135 can request data from one or more vehicles 101 other than the vehicle 101 according to the request from the vehicle 101. In addition to the data collected by the camera 140, the infrastructure server 135 can request that respective computers 105 in one or more vehicles 101 actuate respective sensors 110 to collect data about the requesting vehicle 101 and/or the geographic location. The computer 105 can transmit the data to the infrastructure server 135, and the infrastructure server 135 can identify geo-coordinates to address the data anomaly.

Figure 3:
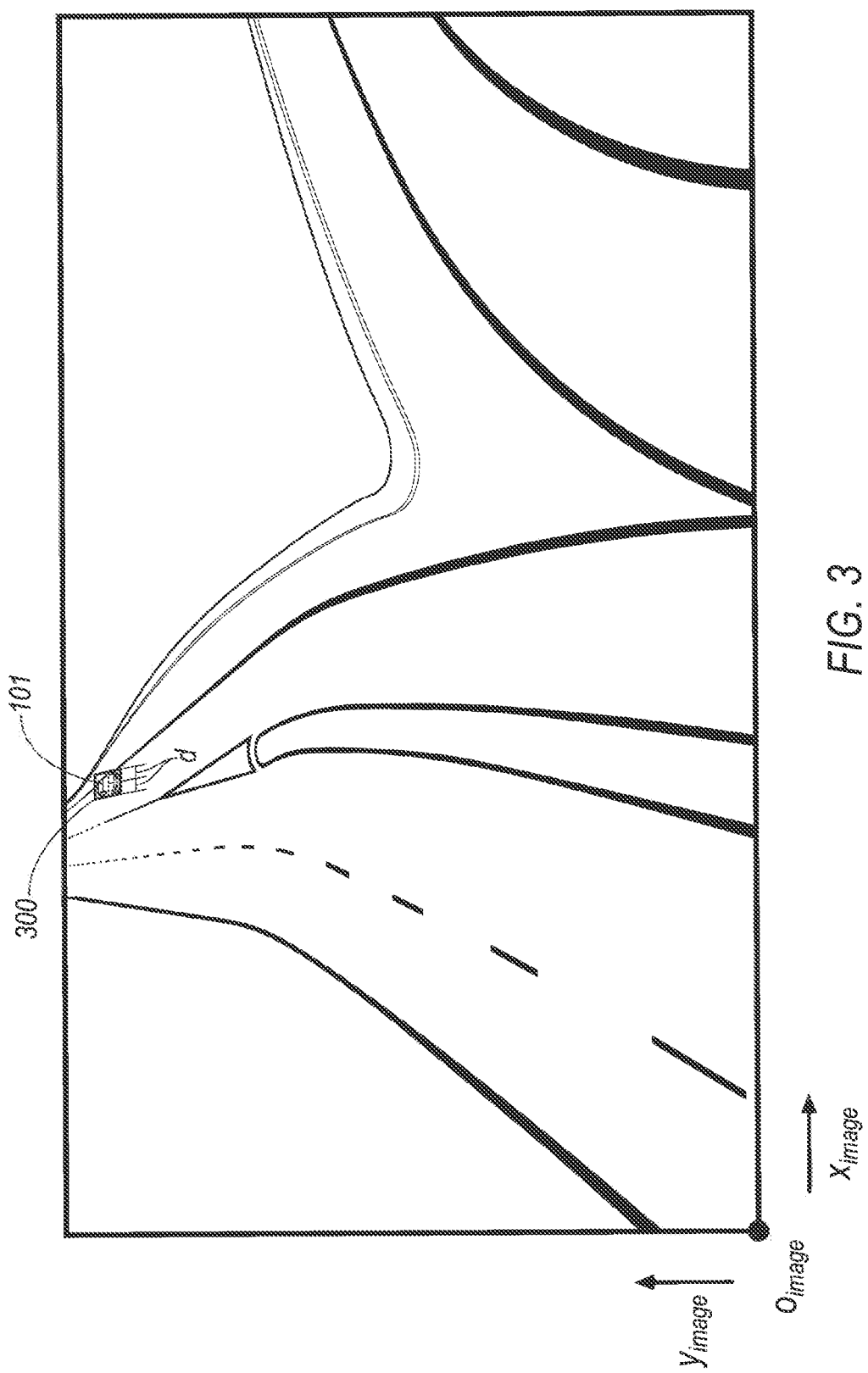
FIG. 3 is a perspective view of one of the plurality of vehicles from a camera mounted to the infrastructure element.

FIG. 3 is a view of the roadway and the vehicle 101 from the perspective of the camera 140 mounted to the infrastructure element 130. The infrastructure server 135 can collect an image of the roadway. The image includes a plurality of pixels. The image can define a local coordinate system having a horizontal axis $x_{image}$ and a vertical axis $y_{image}$ extending from an origin $O_{image}$.

The infrastructure server 135 can associate each pixel with a "distance resolution," d i.e., a distance along the $x_{image}$ direction in the local coordinate system defined by the image. The distance resolution has units of length, e.g., meters, centimeters, etc. The distance resolution d of a specified pixel corresponds to a real-world distance defining one side of the rectangular area captured by the specified pixel. Because the field of view of the camera 140 is not a top-down view, each pixel can have a different distance resolution d. That is, at least some pixels can receive light from portions of the roadway farther away from the infrastructure element 130 than other pixels that receive light from portions of the roadway closer to the infrastructure element 130. The closer the portion of the roadway is to the infrastructure element, the smaller the distance resolution d assigned to the pixel. Because the pixel is square, the computer 105 can approximate the distance in the $y_{image}$ direction of the pixel as the value of the distance resolution d. That is, the distance resolution d of each pixel defines a value for a horizontal distance in the $x_{image}$ direction and a same value for a vertical distance in the $y_{image}$ direction.

The infrastructure server 135 can assign each pixel with a specified distance resolution d based on a reference measure, e.g., a width of a typical vehicle 101. That is, the infrastructure server 135 can detect edges of the vehicle 101 with, e.g., Canny edge detection, and can identify a number of pixels in the $x_{image}$ direction extending from one of the edges to another of the edges. Based on the number of pixels and a predetermined width of a vehicle 101 (e.g., 190 centimeters), the infrastructure server 135 can assign a distance resolution d to each pixel. For example, in the example of FIG. 3, the width of the vehicle 101 can extend across 36 pixels, so the distance resolution d for each pixel is 190/36=5.3 centimeters, to one decimal place.

The infrastructure server 135 can identify the geo-coordinates of the vehicle 101 and/or the geographic location based the respective distance resolutions d for the pixels including the vehicle 101 or the geographic location. The infrastructure server 135 can identify the pixels including the vehicle 101 or the geographic location and, based on the distance resolutions d of the pixels, identify a relative distance between the vehicle or the geographic location and the infrastructure element 130. That is, the infrastructure server 135 can assign geo-coordinates to each pixel based on the relative distance between the known geo-coordinates of the infrastructure element 130 and the location including the pixel. The infrastructure server 135 can provide the geo-coordinates assigned to the pixels including the vehicle 101 or the geographic location to the computer 105 to address the data anomaly.

The infrastructure server 135 can identify a boundary 300 including the vehicle 101 or the geographic location. The boundary 300 is a geometric shape enclosing the vehicle 101 or the geographic location. Because the vehicle 101 or the geographic location may not entirely occupy each associated pixel, the infrastructure server 135 can identify the boundary 300 such that all of the pixels including at least a portion of the vehicle 101 or the geographic location are within the boundary 300. That is, the geo-coordinates of the pixels within the boundary 300 include at least the geo-coordinates of the vehicle 101 or the geographic location. The infrastructure server 135 can provide the geo-coordinates of the pixels enclosed by the boundary 300 to the computer 105.

Figure 4:
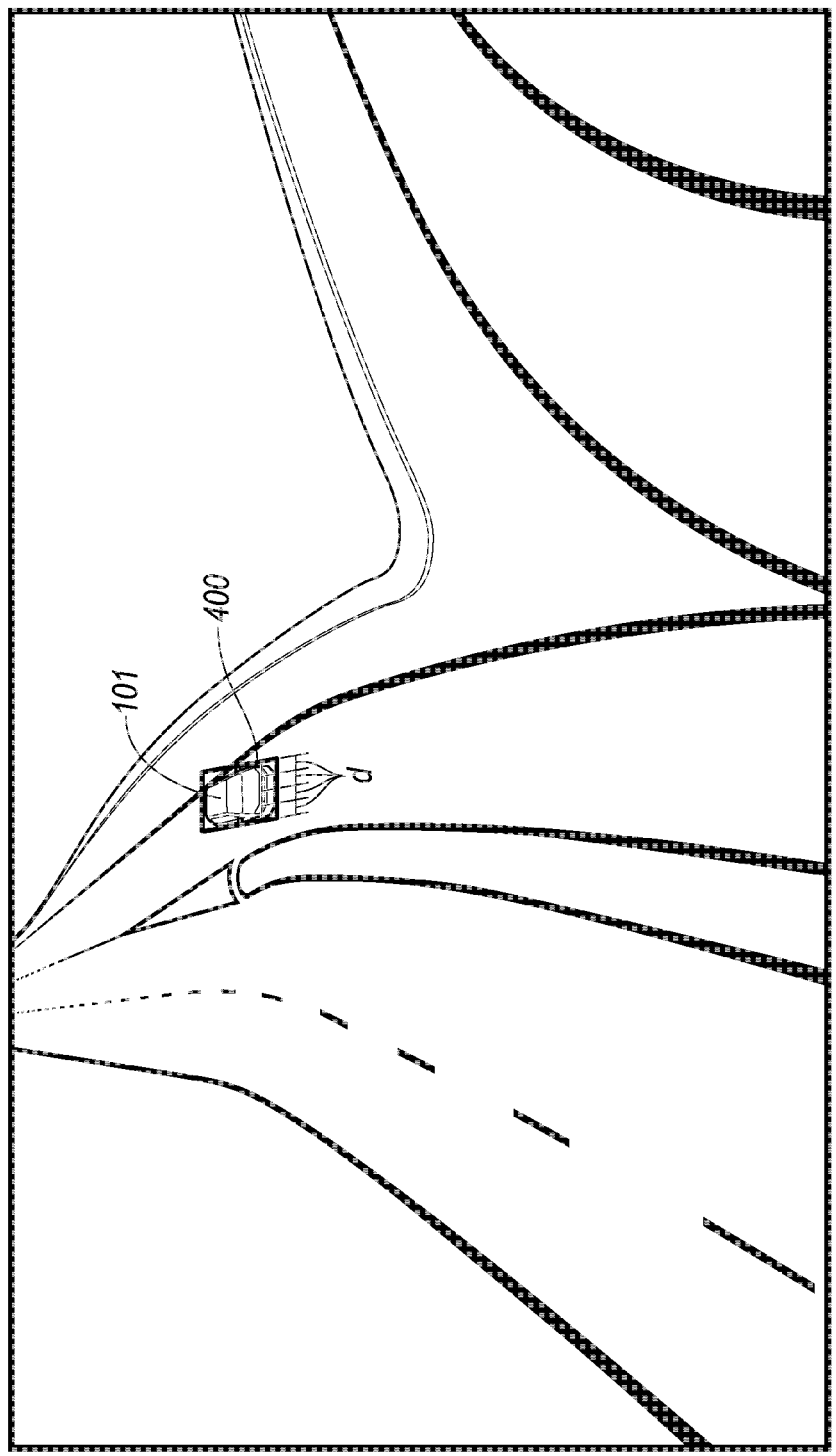
FIG. 4 is a perspective view of the vehicle of FIG. 3 approaching the infrastructure element.

FIG. 4 is an image of the vehicle 101 closer to the infrastructure element 130 than shown in FIG. 3. Because the vehicle 101 is closer to the infrastructure element 130 than in FIG. 3, the distance resolution d of the pixels including the vehicle 101 is smaller than the distance resolution shown in FIG. 3. That is, the width of the vehicle 101 of 190 cm extends across more pixels in FIG. 4 than in FIG. 3, and each pixel has a smaller distance resolution d. In the example of FIG. 4, the width of the vehicle 101 extends across 70 pixels, so the distance resolution d is 190/70=2.7 cm, to one decimal place. FIG. 4 illustrates a boundary 400 enclosing the vehicle 101. The infrastructure server 135 can identify geo-coordinates for the locations included in the pixels within the boundary 400. The infrastructure server 135 can provide the identified geo-coordinates to the computer 105 of the vehicle 101 to address the data anomaly.

Figure 5:
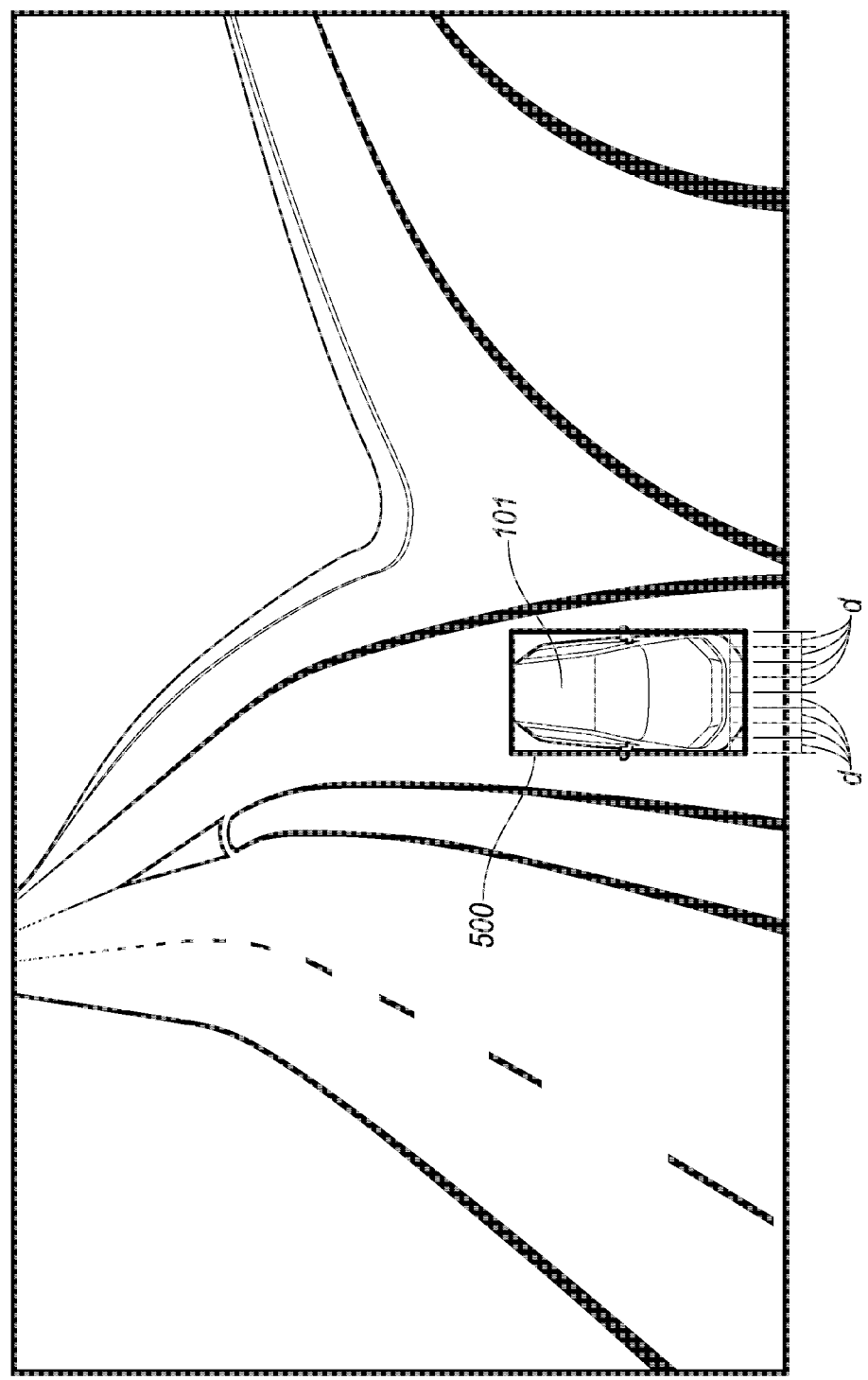
FIG. 5 is a perspective view of the vehicle of FIG. 3 approaching the infrastructure element.

FIG. 5 is an image of the vehicle 101 closer to the infrastructure element 130 collected by the camera 140. The width of the vehicle 101 extends across 168 pixels, so the distance resolution d is 190/168=1.1 cm, to one decimal place. FIG. 5 illustrates a boundary 500 enclosing the vehicle 101. The infrastructure server 135 can identify geo-coordinates for the locations included in the pixels in the boundary 500. Because the distance resolution d for pixels assigned to locations closer to the infrastructure element 130 is smaller than the distance resolution for pixels assigned to locations farther from the infrastructure element 130, the infrastructure server 135 can identify geo-coordinates more precisely (i.e., with less possible distance resolution error) for pixels including locations closer to the infrastructure element 130. That is, the geo-coordinates between adjacent pixels within the boundary 500 differ by 1.1 cm, and the geo-coordinates between adjacent pixels within the boundary 300 differ by 5.3 cm. This additional distance precision for closer pixels allows the infrastructure server 135 to provide more precise geo-coordinates to the computer 105 to address the data anomaly.

Figure 6:
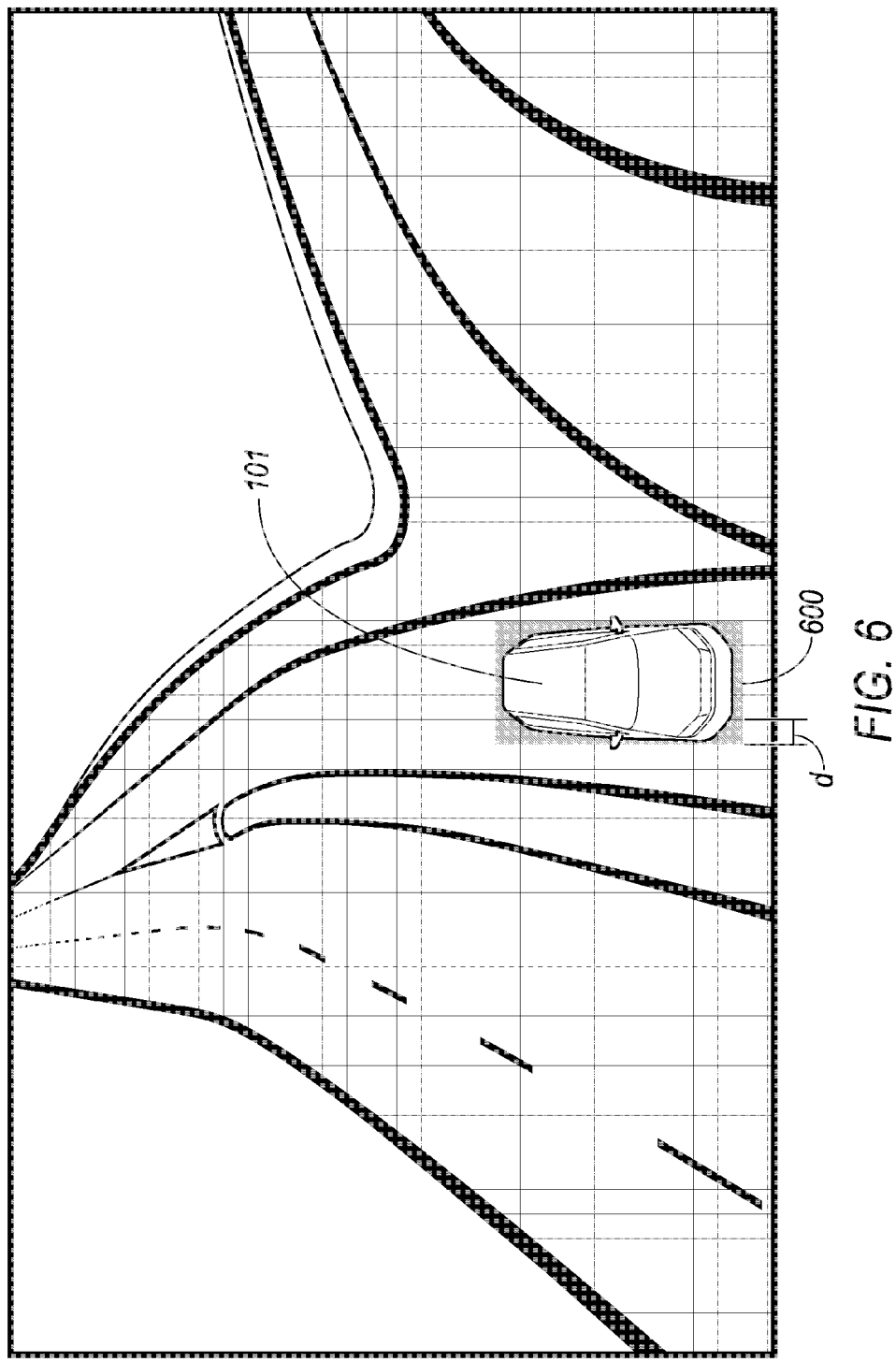
FIG. 6 is a perspective view illustrating a plurality of pixels of an image collected by the camera.

FIG. 6 illustrates the pixels 600 of the image collected by the camera 140, only one of which is identified for clarity. As described above, the infrastructure server 135 can assign a distance resolution d to each pixel 600 based on collected image data about vehicles 101 on the roadway. Upon assigning the distance resolution d, the infrastructure server 135 can identify geo-coordinates for each pixel 600 based on geo-coordinates of the infrastructure element 130 and the distance resolutions. That is, for a specified pixel 600, the infrastructure server 135 can add the distance resolutions d of pixels 600 extending from an edge of the image (e.g., a lower edge) to the specified pixel 600. The sum of the distance resolutions of the pixels 600 is a distance from the infrastructure element 130, represented by the lower edge of the image, to the location included in the specified pixel 600. The infrastructure server 135 can add the distance from the infrastructure element 130 to predetermined geo-coordinates of the infrastructure element 130, e.g., as provided by a server 125 to the infrastructure server 135, to determine geo-coordinates of the location assigned to the specified pixel 600. The infrastructure server 135 can thus identify geo-coordinates for each pixel 600 of the image and store the geo-coordinates in the memory. Then, upon identifying pixels 600 including the vehicle 101 and/or the geographic location, the infrastructure server 135 can recall the geo-coordinates assigned to the identified pixels and transmit the geo-coordinates to the vehicle 101.

Upon receiving the request from the vehicle 101 including the data anomaly, the infrastructure server 135 can actuate the camera 140 to collect images of the roadway. The infrastructure server 135 can use a conventional image-processing algorithm, e.g., Canny edge detection, to identify the pixels including the vehicle 101 or the geographic location included in the request. Upon identifying the pixels, the infrastructure server 135 can identify the geo-coordinates assigned to the pixels and provide the geo-coordinates to the computer 105 to address the data anomaly. In the example of FIG. 6, the shaded pixels represent the vehicle 101, and the infrastructure server 135 can provide the geo-coordinates assigned to the shaded pixels to the computer 105.

Figure 7:
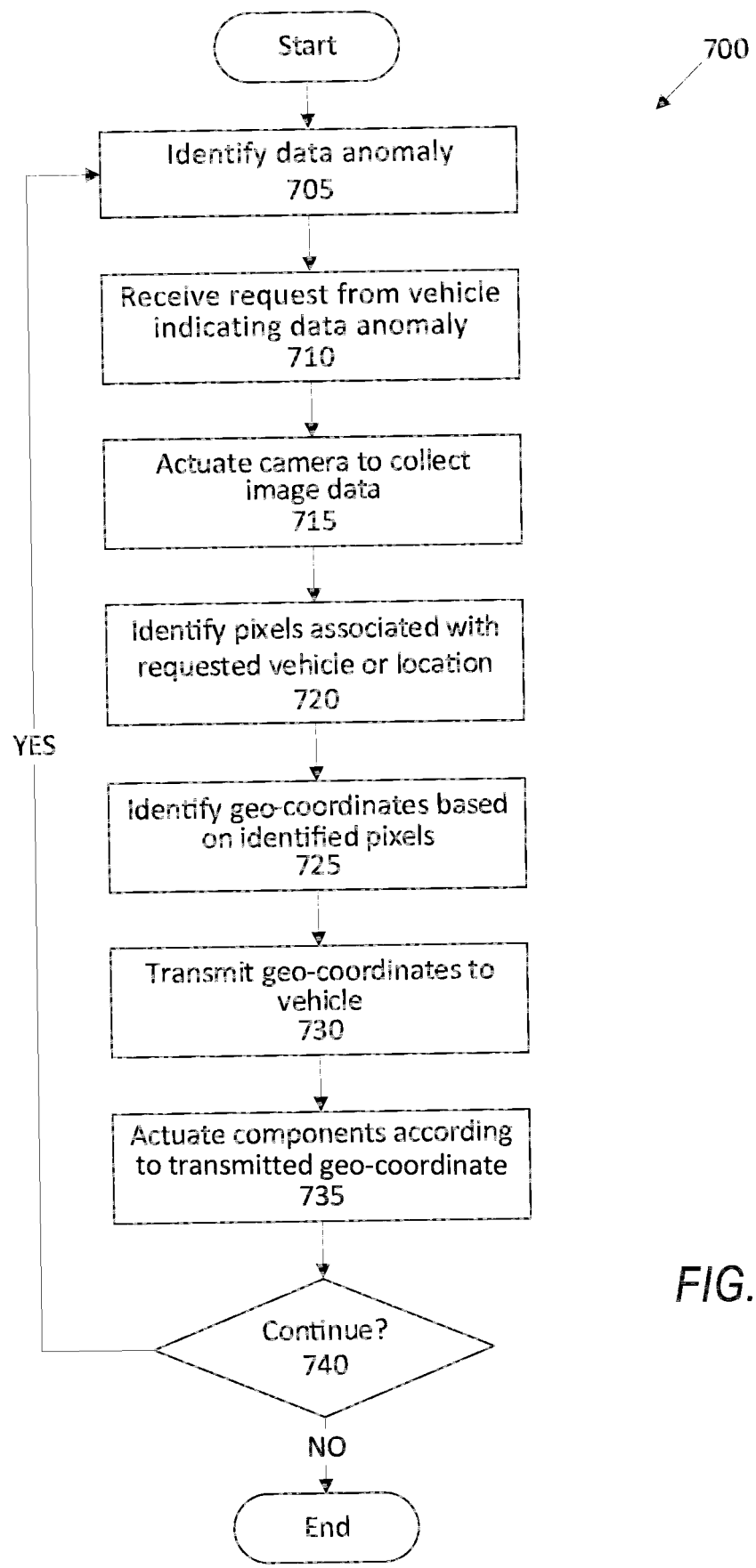
FIG. 7 is a block diagram of an example process for detecting a vehicle.

FIG. 7 is a block diagram of an example process 700 for detecting a vehicle 101. The process 700 begins in a block 705, in which a computer 105 of a vehicle identifies a data anomaly. As described above, a computer 105 in the vehicle 101 can identify the data anomaly upon determining that a sensor 110 is collecting data below a confidence threshold and/or the computer 105 identifies a geographic location not present in a geographic database of the computer 105.

Next, in a block 710, an infrastructure server 135 mounted to an infrastructure element 130 receives a request from the vehicle 101 indicating a data anomaly. The request can include an indication of the data to address the data anomaly. For example, the request can include an indication of the geographic location not present in the geographic database of the computer 105.

Next, in a block 715, the infrastructure server 135 actuates a camera 140 to collect image data. The camera 140 collects a plurality of images of the roadway and stores the images in a memory of the infrastructure server 135. Each image includes a plurality of pixels. The image can include a plurality of vehicles 101 and/or geographic locations to address data anomalies of one or more computers 105.

Next, in a block 720, the infrastructure server 135 identifies a plurality of pixels including the vehicle 101 and/or the geographic location identified in the request. The infrastructure server 135 can use an image-processing technique, e.g., Canny edge detection, to identify the vehicle 101 and/or the geographic location and its associated pixels in the image.

Next, in a block 725, the infrastructure server 135 identifies geo-coordinates assigned to the pixels in the image. As described above, the infrastructure server 135 can identify a distance resolution for each pixel based on a reference metric, e.g., a width of a vehicle 101. The infrastructure server 135 can identify the geo-coordinates of an identified pixel by adding the distance resolutions of all pixels from an edge of the image to the identified pixel to geo-coordinates of the infrastructure element 130. That is, the infrastructure server 135 can use a known set of geo-coordinates of the infrastructure element 130 stored in the memory and the distance represented by the distance resolutions of the pixels from the edge of the image to the identified pixel to assign geo-coordinates to each pixel of the image. The infrastructure server 135 can store the assigned geo-coordinates in the memory. Upon identifying pixels including the vehicle 101 and/or the geographic location, the infrastructure server 135 can recall the geo-coordinates assigned to the identified pixels.

Next, in a block 730, the infrastructure server 135 transmits the geo-coordinates to the computer 105 of the vehicle 101 over the network 120. As described above, the infrastructure server 135 can broadcast the geo-coordinates over the network 120 until the vehicle 101 leaves a broadcast range of the infrastructure server 135. The computer 105 can use the received geo-coordinates to address the data anomaly.

Next, in a block 735, the computer 105 of the vehicle 101 actuates one or more components 115 according to the transmitted geo-coordinates. Because the computer 105 receives geo-coordinates to address the data anomaly, the computer 105 can operate the vehicle 101 with data that would have been collected by the faulty sensor 110 and/or into the location not present in the memory of the computer 105. For example, the computer 105 can actuate a propulsion and a steering to move the vehicle 101 toward the location not present in the memory of the computer 105.

Next, in a block 740, the infrastructure server 135 determines whether to continue the process 700. For example, the infrastructure server 135 can determine to continue upon receiving another request from a vehicle 101. If the infrastructure server 135 determines to continue, the process 700 returns to the block 705. Otherwise, the process 700 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
a stationary infrastructure element including:
a camera mounted to the infrastructure element; and
an infrastructure server including a processor and a memory, the memory storing instructions executable by the processor to:
receive a request from a movable vehicle, the request identifying a data anomaly including at least one of (1) a sensor of the vehicle collecting data below a confidence threshold or (2) a geographic location outside a geographic database of the vehicle;
actuate the camera to collect image data of one of the vehicle or the geographic location;
identify geo-coordinates of the vehicle or the geographic location based on identified pixels in the image data including the vehicle or the geographic location; and
provide the geo-coordinates to the vehicle to address the data anomaly.

2. The system of claim 1, wherein the instructions further include instructions to request data from one or more vehicles other than the vehicle according to the request from the vehicle.

3. The system of claim 1, wherein the instructions further include instructions to provide the requested data to the vehicle until the vehicle exits a broadcast range of the infrastructure server.

4. The system of claim 1, wherein the instructions further include instructions to assign a distance resolution to each pixel and to identify the geo-coordinates of the vehicle or the geographic location based on the respective distance resolutions for the pixels assigned to the vehicle or the geographic location.

5. The system of claim 4, wherein the instructions further include instructions to identify a relative distance between the infrastructure element and the vehicle or the geographic location based on the respective distance resolutions for the pixels including the vehicle or the geographic location.

6. The system of claim 1, wherein the instructions further include instructions to assign geo-coordinates to each pixel and to provide, to the vehicle, the respective geo-coordinates assigned to the pixels including the vehicle or the geographic location.

7. The system of claim 1, wherein the instructions further include instructions to identify a boundary including the vehicle or the geographic location and to provide geo-coordinates of pixels enclosed by the boundary to the vehicle.

8. The system of claim 1, wherein the vehicle includes a computer programmed to determine that the sensor is collecting data below the confidence threshold when the sensor fails to collect data.

9. The system of claim 1, further comprising a vehicle computer programmed to compare a planned path of the vehicle to a high-resolution map stored in the memory of the computer and to identify the data anomaly when at least one geographic location of the planned path is not provided in the high-resolution map.

10. The system of claim 1, further comprising a vehicle computer programmed to, upon identifying the data anomaly, identify a geographic area in which the sensor did not collect data and to send the request including the identified geographic area.

11. The system of claim 1, further comprising a vehicle computer programmed to determine an occlusion of the sensor and to determine that the sensor is collecting data below the confidence threshold when the occlusion exceeds an occlusion threshold.

12. The system of claim 1, further comprising a vehicle computer programmed to identify the data anomaly when image data collected by the sensor of the vehicle includes a light saturation from sunlight exceeding a saturation threshold.

13. A method, comprising:
receiving a request from a movable vehicle, the request identifying a data anomaly including at least one of (1) a sensor of a vehicle collecting data below a confidence threshold or (2) a geographic location outside a geographic database of the vehicle;
actuating a camera to collect image data of one of the vehicle or the geographic location;
identifying geo-coordinates of the vehicle or the geographic location based on identified pixels in the image data including the vehicle or the geographic location; and
providing the geo-coordinates to the vehicle to address the data anomaly.

14. The method of claim 13, further comprising requesting data from one or more vehicles other than the vehicle to collect the requested data.

15. The method of claim 13, further comprising providing the requested data to the vehicle until the vehicle exits a broadcast range of an infrastructure server.

16. The method of claim 13, further comprising assigning a distance resolution to each pixel and to identify the geo-coordinates of the vehicle or the geographic location based on the respective distance resolutions for the pixels assigned to the vehicle or the geographic location.

17. The method of claim 16, further comprising identifying a relative distance between an infrastructure element and the vehicle or the geographic location based on the respective distance resolutions for the pixels including the vehicle or the geographic location.

18. The method of claim 13, further comprising assigning geo-coordinates to each pixel and providing, to the vehicle, the respective geo-coordinates assigned to the pixels including the vehicle or the geographic location.

19. The method of claim 13, further comprising identifying a boundary including the vehicle or the geographic location and providing geo-coordinates of pixels enclosed by the boundary to the vehicle.

20. The method of claim 13, further comprising comparing a planned path of the vehicle to a high-resolution map and to identify the data anomaly when at least one geographic location of the planned path is not provided in the high-resolution map.

* * * * *